April 21, 1931.   H. E. DERR, SR   1,802,004
STEERING CONTROL FOR MOTOR VEHICLES
Filed Sept. 28, 1923
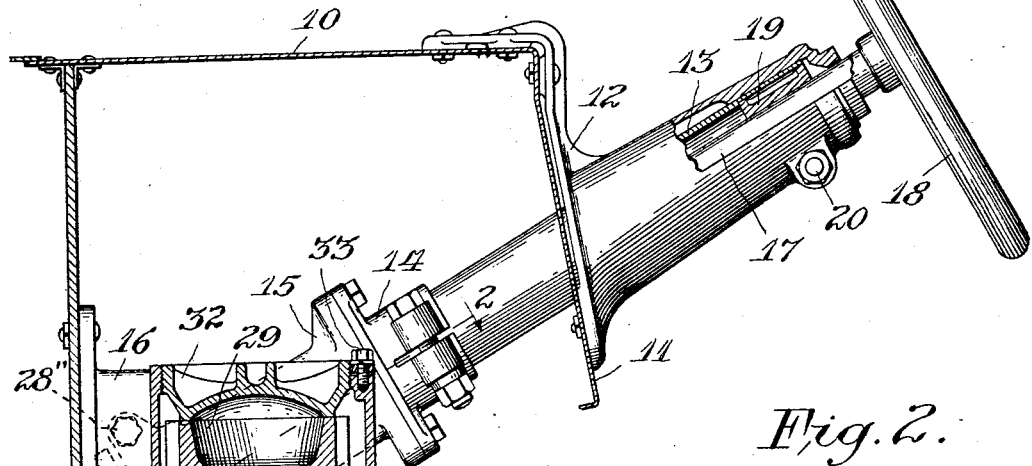
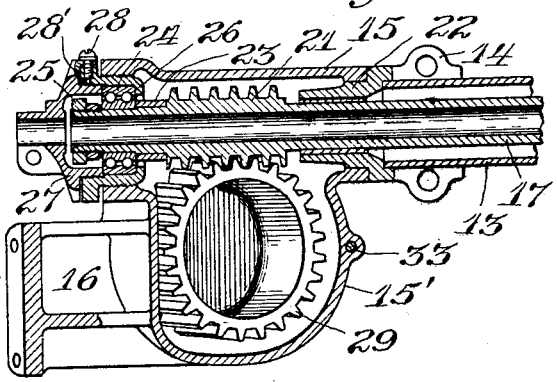
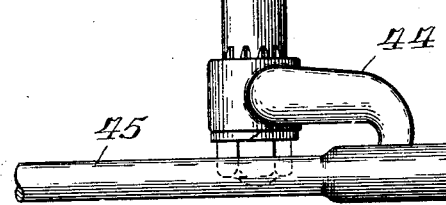
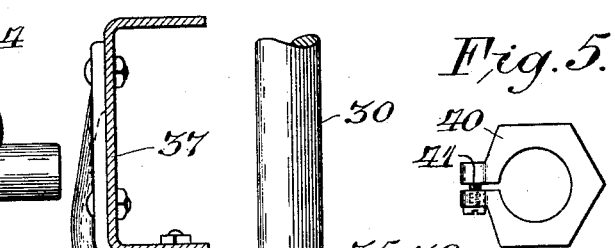
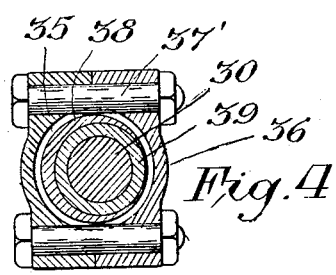

Patented Apr. 21, 1931

1,802,004

UNITED STATES PATENT OFFICE

HARRY E. DERR, SR., OF AKRON, OHIO, ASSIGNOR TO INTERNATIONAL HARVESTER COMPANY, OF CHICAGO, ILLINOIS, A CORPORATION OF NEW JERSEY

STEERING CONTROL FOR MOTOR VEHICLES

Application filed September 28, 1923. Serial No. 665,270.

My invention relates to steering mechanism for motor propelled vehicles and particularly to the so-called nonreversible type, wherein road shocks cannot be transmitted to the steering control wheels adjacent the driver's seat.

These steering mechanisms are quite standard in construction and usually comprise a relatively long, unbroken shaft which is inclined to project either through the dash, foot board, or floor of the vehicle, the reduction gearing for operating the wheel turning means from this shaft being mounted exteriorly of the cab, and usually below the cab floor on the vehicle channel frame. In use, the driver of the vehicle must straddle this steering shaft and column, by placing one leg on each side thereof, which obviously considerably cramps the driver and prevents freedom of movement in the cab. Likewise, the angle at which the steering shaft is placed is such that the command of the vehicle is not as comfortable as it might be.

The primary object of this invention is, therefore, to provide a "leg room" construction to the end that the driver may command a more complete and comfortable control of his vehicle than has heretofore been possible with such conventional steering units.

Another object is to provide a construction in which the reduction gearing will be located in the space beneath the cowl, adjacent the dash, and considerably above the frame of the vehicle.

Still another object is to provide a steering mechanism in which the entire assembly comprising the steering shaft and reduction gearing is located in the cab of the vehicle and in such a manner that a free cab space is obtained.

It is also an object to provide a steering mechanism adapted to practicable commercial use, and one which will not readily get out of working order.

Other objects will be apparent to those skilled in the art to which my invention appertains, as the description thereof progresses.

Briefly, these very desirable objects are achieved in a vehicle having a frame, dash and cowl, by providing a steering shaft made up of two sections, one of which is substantially parallel with the dash and is supported on the frame and extends upwardly into the cab a substantial distance above the frame. The other shaft section, because of the height of the vertical section, is inclined at a slight angle with respect to the horizontal to meet the vertical shaft and may be connected operatively thereto by steering reduction gearing located closely adjacent the dash and in the cab where they cannot interfere with the driver's legs. The inclined shaft section carries the hand wheel at a comfortable rake. The vertical shaft section is connected to operate the wheel turning means.

The structure and operation of my device will be made more clear by reference to the illustrative embodiment shown and described in the accompanying specification and sheet of drawings. Throughout the specification and drawings like reference characters are employed to indicate corresponding parts, and in the drawings,—

Fig. 1 is a side elevation of my improved steering device, partly in section, and showing its arrangement with respect to the frame, dash, space beneath the cowl and instrument panel of the vehicle;

Fig. 2 is a sectional plan view, partly in perspective, of the steering reduction gear assembly, the view being taken along line 2—2 of Fig. 1 looking in the direction of the arrows;

Fig. 3 is a detail view, showing a bearing and its support on the frame, for maintaining the vertical steering shaft section in vertically aligned position;

Fig. 4 is a detail sectional view of the same bearing taken along line 4—4 of Fig. 1, looking in the direction of the arrows; and Fig. 5 is a detail bottom plan view of the cap for the male member of the bearing assembly.

The motor vehicle, not shown, carries the usual dash 9 and cowl 10, the cab side of the cowl being provided with an instrument board or panel 11. Bolted over the top of the cowl and instrument panel is a supporting bracket 12 having an upwardly and rearwardly inclined portion, of short length, hollowed out, to receive a tubular post 13, which post extends through the instrument panel into the interior of the compartment beneath the cowl, as shown. The lower end of this post or casing is mounted in a housing 14, bolted to another housing 15 supported on the cab side of the dash by means of an integral bracket 16.

Rotatably mounted in the casing 13 is a steering shaft section in the form of a tube 17 and fixed thereto at its outer or rear end is the steering hand wheel 18. The tube 17 is held in proper position with respect to the casing by means of a bushing 19 in which the tube may freely rotate. The bracket 12 is split along one side to form a conventional pinch bind 20 adjacent the bushing 19. The housing 14, supporting the casing 13, is split in a like manner to form another pinch bind, the purpose of this method of assembly being solidly to lock the casing and housing together as though it were one unit, after being assembled, as will be readily understood.

Adjacent the end of the tube or shaft section 17 and integral therewith is a worm gear 21 positioned centrally in the housing 15. A bearing 22 is provided within the housing to hold the tube in position and provide a suitable bearing surface therefor. The end of the worm abuts a spacer or collar 23 surrounding the steering tube, the collar in turn bearing against a ball bearing 24 adapted to take up and receive end thrusts of the steering tube. The end of the tube is threaded for the reception of a nut and lock nut 25, whereby the parts just described may be kept in proper adjusted position. It will be observed that the lower end of the housing 15 is flared slightly outwardly and that its inner periphery is screw threaded to receive a mating screw threaded collar 26, which houses the roller bearing 24 above mentioned. The member 26 is extended a little beyond the end of flared portion of the housing 15, and its inner periphery is also screw threaded to receive a cooperating screw threaded cap 27 to provide a suitable dust proof, and lubricant containing enclosure. A set screw 28 may be fitted through the cap 27, as shown, to engage a key 28′, held in place between members 26 and 27 to prevent any possible relative movement between the two. Another pinch bind 28″ is provided at the lower end of the housing 15, which also assists in maintaining these parts as a solid assembly.

Extending laterally of the housing 15 and positioned horizontally is an integral enlarged casing 15′ enclosing a worm pinion 29 meshing with the worm 21 in the communicating housing 15. These worm gears comprise the steering reduction means. This worm pinion 29 is fixed to the upper end of a vertically depending steering shaft section 30 and operates on a bearing 31 supported in the casing. This casing 15′ is closed at its top by means of a removable screw threaded cap 32 adapted to be screwed into the casing. This cap also serves as an adjusting means for the worm wheel 29. Any suitable locking means 33 may be provided to prevent loosening of the cap. The casing just described is dust proof and contains a suitable lubricant. A sealing packing ring 34 is arranged in the bottom of the casing to surround the steering shaft 30 and thus prevent possible leakage and loss of the lubricant.

The shaft section 30 is slidably supported in a bearing indicated generally at 35, carried by a bracket 36 riveted or otherwise fixed to a channel bar 37 of the vehicle frame. This bearing is utilized in properly aligning the shaft 30 with respect to the bearing 31 and also provides an intermediate point for absorbing road shocks. The construction of the bearing and bracket will now be briefly described. It should be here understood that the bearing per se forms no part of the present invention and that the same is covered in a separate application bearing Serial No. 1,766, filed January 12, 1925.

The bracket 36 as stated is fixed to the vehicle frame, it depending therefrom and terminating in a two part support. These supporting members are each semi-circular in form and are bolted together by bolts 37′ to provide a cup shaped recess for the reception of an annular cup like female member 38, the bolts 37′ holding this member against axial movement with respect to the shaft. This is made possible by providing an annular groove on the outer periphery of the female member, the bolts 37′ lying in the groove and tangent thereto, as clearly shown in Figs. 1 and 4. The steering shaft 30, it will be observed, slidably carries a ball 39 which in turn is rotatably supported in the female member above described. To prevent dislodgment of this ball a suitable male member 40 is threaded into the female member. An adjusting means, such as a screw 41, may be provided to expand the walls of the member 40 should it be necessary. (See Fig. 5.) The adjusting means just described forms an expanding bind and works oppositely to the pinch binds heretofore described.

It is extremely important to note that the ball 39 is concentric with the shaft 30 and that the female member 38 housing the ball is eccentric of the steering shaft. Thus, in assembling the steering device, there is a tendency to self alignment of the shaft 30 with respect to the bearing 31.

It should be understood that the eccentric feature just described serves merely as an aid to proper assembly and alignment of the shaft 30 with respect to the bearing 31 and that, when once properly assembled, the parts are securely locked in place by the bolts 37'.

This bearing may be lubricated by any standard pressure means such as a cup 42 and oil grooves 43. Packing rings may also be provided as shown in Fig. 1.

The shaft section 30 has fixed at its lower end an arm 44, which operates a drag link 45 in a horizontal plane, as will be observed. By operating this link horizontally a desirable advantage is achieved in that a more positive and complete steering control of the vehicle wheels is effected.

These specific details of construction are of the greatest importance in achieving the leg room advantage heretofore mentioned. The steering shaft comprising the two sections 17 and 30 operatively connected by the reduction gears 21 and 29 are the gist of this invention, as they permit of a location of the steering control column and reduction gearing completely in the cab of the vehicle in a manner resulting in a free cab space. The vertical shaft section 30 extends so far above the frame 37 into the cab space as to permit inclining the shaft section 17 at a relatively slight angle with respect to the horizontal which is highly desirable from the viewpoint of comfort.

The particular mounting of the inclined, short, steering control tube 17 in the bracket 12 on the instrument panel 11 at one end, and at its other end in the bracket 16 on the dash 9, above the vehicle frame in the cab space, is of the greatest importance. First, because the shaft or tube 17 is relatively short, all steering torque, or torque springiness, is reduced to a minimum, if not entirely eliminated. Second, because of the shortness of this steering tube shaft, its end bearings are relatively close together, thereby insuring further rigidity and ease of operation by additionally having such proximate bearings take all steering torque. The hollow extension of the bracket 12, which is practically coextensive in length with the end of the tube 17 projected rearwardly of the instrument panel, is another important factor in the rigid mounting of the said tube shaft 17. Thus, this bracket 12 prevents steering wheel strains from being transmitted to the tube 17 and also makes a rigid, direct tie between the cowl 10 and hand wheel. The proximity of the worm reduction gears and the hand wheel enhances greater strength and rigidity by virtue of a more direct connection between such units which in conventional systems are relatively widely separated.

It will thus be seen that there is herein provided apparatus in which the several objects of this invention are achieved, and that the same is of simple construction, yet dependable in action, and is well adapted to meet the exacting conditions of hard practical use.

As various possible embodiments might be made of my invention, and, as various changes might be made in the embodiment set forth, it is to be understood that all matter in the specification and drawings is to be interpreted as illustrative and not in a limiting sense.

I claim:

1. In a motor vehicle in combination with a frame, a dash, a cowl, a member depending from said cowl and spaced rearwardly of the dash and steering control means for said vehicle having an upright shaft to the rear of the dash, a hand wheel shaft inclined to vertical and horizontal planes, gearing connecting the upper and lower ends of the upright and inclined shafts respectively, a tube surrounding the inclined shaft, supporting means fixed to the dash in which said upright shaft is mounted and to which the lower end of said tube is rigidly connected, a bracket fixed to said depending member and to which the upper end of said tube is connected, whereby the torque imparted to the inclined shaft by the hand wheel is taken up by the tube between the bracket and lower supporting means.

2. In a motor vehicle, the combination with a dash, a cowl, a member depending from the cowl, an inclined steering shaft having a hand wheel, a shaft tube and a rigid support for the lower end of said tube fixed to the dash, of a supporting bracket for the upper part of said tube fixed to said member depending from the cowl and having an upwardly projecting hollow extension surrounding the tube and bearing against the end of the latter, said extension terminating adjacent the hand wheel.

In testimony whereof I affix my signature.

HARRY E. DERR, Sr.